United States Patent
Nalette et al.

(10) Patent No.: US 6,797,043 B2
(45) Date of Patent: Sep. 28, 2004

(54) ENCAPSULATED CO₂ H₂O SORBENT

(75) Inventors: Timothy A. Nalette, West Stafford, CT (US); Catherine Thibaud-Erkey, South Windsor, CT (US)

(73) Assignee: Hamilton Sundstrand, Windsor Locks, CT (US)

( * ) Notice: Subject to any disclaimer, the term of this patent is extended or adjusted under 35 U.S.C. 154(b) by 0 days.

(21) Appl. No.: 10/264,246

(22) Filed: Oct. 3, 2002

(65) Prior Publication Data

US 2004/0065205 A1 Apr. 8, 2004

(51) Int. Cl.⁷ ............................................. B01D 53/02
(52) U.S. Cl. ............................ 96/134; 96/154; 55/492; 55/515; 55/525
(58) Field of Search ................... 96/108, 134, 147, 96/154; 55/492, 521, 515, 525; 95/139; 423/220; 244/163; 206/0.7

(56) References Cited

U.S. PATENT DOCUMENTS

| | | | |
|---|---|---|---|
| 3,577,988 A | | 5/1971 | Jones |
| 3,615,233 A | * | 10/1971 | Doering et al. ............. 422/117 |
| 3,713,281 A | * | 1/1973 | Asker et al. ................... 96/154 |
| 3,865,924 A | * | 2/1975 | Gidaspow et al. .......... 423/230 |
| 4,409,978 A | | 10/1983 | Bartos |
| 5,079,209 A | | 1/1992 | Nalette et al. |
| 5,091,358 A | | 2/1992 | Birbara et al. |
| 5,174,974 A | | 12/1992 | Birbara et al. |
| 5,281,254 A | | 1/1994 | Birbara et al. |
| 5,354,365 A | * | 10/1994 | Youn ............................ 96/135 |
| 5,376,614 A | | 12/1994 | Birbara et al. |
| 5,423,903 A | * | 6/1995 | Schmitz et al. ............... 96/134 |
| 5,427,751 A | | 6/1995 | Nalette et al. |
| 5,454,968 A | | 10/1995 | Nalette et al. |
| 5,492,683 A | | 2/1996 | Birbara et al. |
| 5,595,949 A | * | 1/1997 | Goldstein et al. ............. 502/20 |
| 5,620,940 A | | 4/1997 | Birbara et al. |
| 5,681,503 A | | 10/1997 | Nalette et al. |
| 5,876,488 A | | 3/1999 | Birbara et al. |
| 6,576,044 B1 | * | 6/2003 | Ho et al. ....................... 95/102 |
| 6,699,309 B1 | * | 3/2004 | Worthington et al. ......... 96/108 |

FOREIGN PATENT DOCUMENTS

| | | | |
|---|---|---|---|
| EP | 0485322 | | 11/1991 |
| WO | WO 96/15027 | * | 5/1996 |

OTHER PUBLICATIONS

European Search Report dated Dec. 18, 2003.

* cited by examiner

Primary Examiner—Frank M. Lawrence
(74) Attorney, Agent, or Firm—Carlson, Gaskey & Olds

(57) ABSTRACT

An assembly for removing carbon dioxide and water from a flow stream includes a housing that defines an inlet and an outlet. A $CO_2$ sorbent sheet is disposed within the housing and includes integrally formed airflow passages and support structures. The $CO_2$ sorbent sheet is encapsulated within a porous metal that is dimensionally stable and increases the rigidity and durability of the $CO_2$ sorbent sheet.

28 Claims, 3 Drawing Sheets

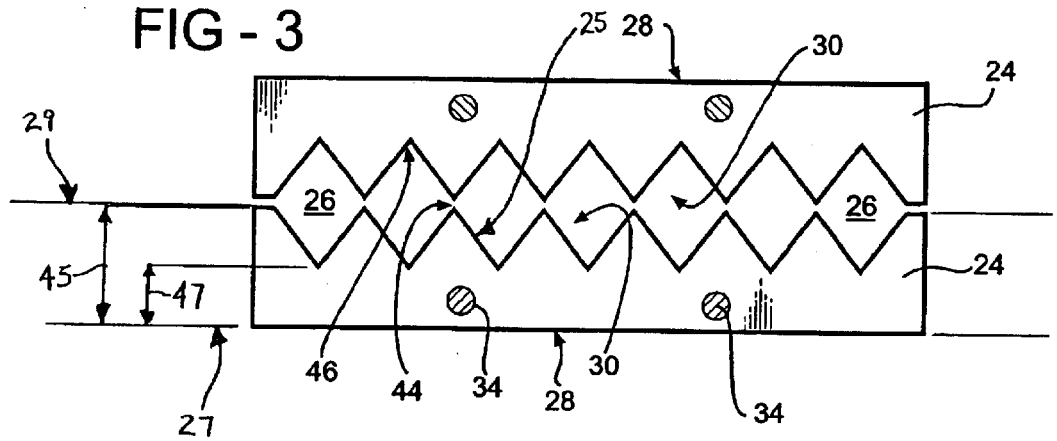
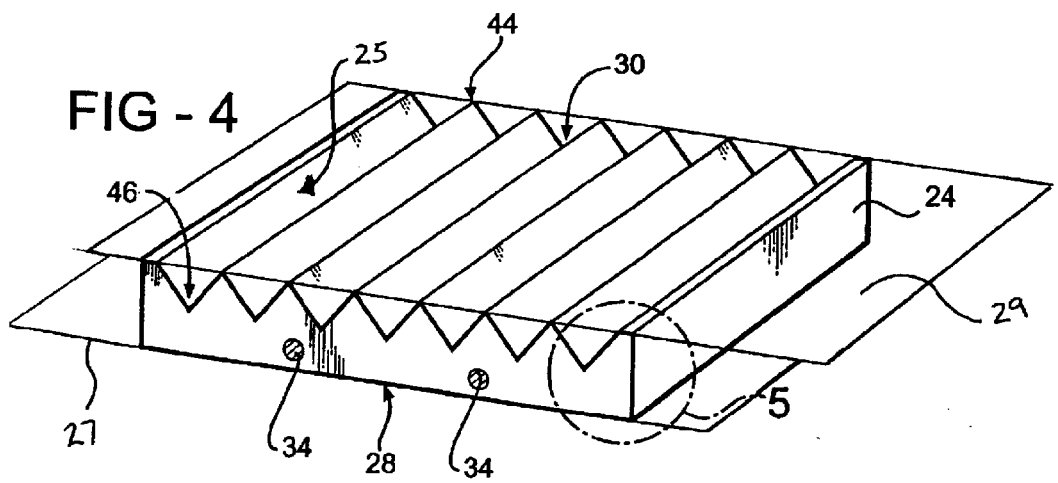
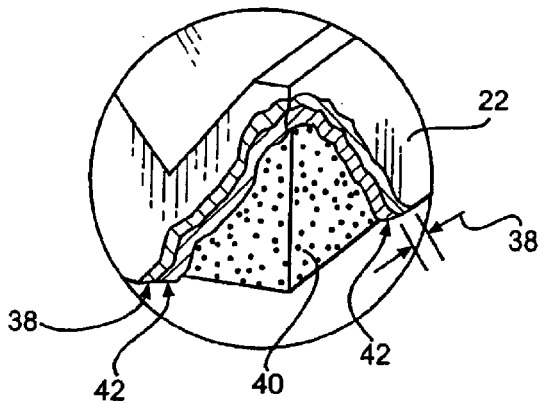
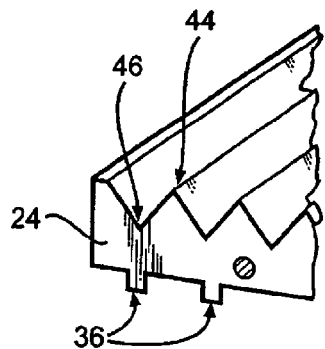

ENCAPSULATED $CO_2$ $H_2O$ SORBENT

BACKGROUND OF THE INVENTION

This invention relates to a system for removing carbon dioxide ($CO_2$) from an air stream and specifically to a metal encapsulated sorbent sheet allowing diffusion of gases for removing $CO_2$.

Currently systems for controlling and removing $CO_2$ from a breathable air supply are utilized in submarines, space vehicles and space suits. These systems pass an air stream through a $CO_2$ sorbent $CO_2$ within the air stream reacts with the sorbent and is trapped. The remainder of the breathable air recirculates into the controlled environment. Once the container has become saturated with $CO_2$ such that further absorption of $CO_2$ is inefficient, the breathable air stream is switched to a second container. The saturated container is either disposed of or regenerated.

Systems that use flat sheet sorbents offer advantages over traditionally packed bed sorbent configurations. These advantages include higher packing densities with lower pressure drops and the potential for flow-by configurations where it is desired to allow air free flow pass the sorbent. Free flow configurations minimize direct contact of the flow stream with the sorbent and reduce entrapment of particles within the sorbent.

Flat sheet sorbents may be regenerable and non-regenerable and are typically encapsulated within a non-metallic material such as a porous fluorinated or non-fluorinated polymeric membrane. Encapsulation of sorbents within a polymeric membrane is costly to manufacture and difficult to handle due to the fragile nature of such construction. The flexibility and fragile nature of the sorbent sheets, in addition to a tendency to expand upon reacting with $CO_2$, require that additional structural elements be included in the overall assembly to prevent damage. The additional structural elements add cost and increase the overall size of the sorbent assembly.

Further, the non-metallic material tends to expand under the heat typically generated during absorption of $CO_2$. As appreciated, airflow passages disposed within the $CO_2$ sorbent sheet are specifically tailored to provide a specific pressure drop tailored to a specific system. Expansion and contraction of the $CO_2$ sorbent may in turn cause undesirable variation of system parameters.

Accordingly, it is desirable to develop a $CO_2$ sorbent sheet that is structurally rigid and is dimensional stable during operation.

SUMMARY OF THE INVENTION

A disclosed embodiment of this invention is a $CO_2$ sorbent sheet encapsulated within a metal material of a porous nature for allowing diffusion of gases from an adjacent flow stream.

The sorbent sheet is encapsulated within a porous metal material having material properties tailored to specific applications to provide the desired absorption by the $CO_2$ system. The sorbent sheet is encapsulated within a porous metal material and allows the absorption of specific quantities of $CO_2$ and water from a flow stream, and prevents extrusion of the sorbent.

In another embodiment of this invention, the metal material includes a plurality of openings to form a fine mesh that allows the diffusion of gases into the sorbent material from an adjacent flow stream.

Further, the $CO_2$ sorbent sheet of this invention includes integrally formed air passages that are dimensioned relative to the desired pressure drop and configuration of the system. The integrally formed air passages cooperate with other sorbent sheets assembled within the system to provide the specific dimensions for airflow through the system. The sorbent sheets include support rods that extend the entire length of the sorbent sheet and are integrally formed within the sorbent sheet. Further, in one embodiment of this invention, the air passages are integrally formed along one side of the $CO_2$ sorbent sheet and cooperate with other sheets disposed within a housing to form airflow passages that provide a specifically desired pressure, drop through the system.

Accordingly, the system and assembly of this invention provides a durable and cost effective sorbent sheet that reduces manufacturing costs by reducing the number of parts required and increases the durability and survivability of each sorbent sheet assembly.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows:

FIG. 3 is an embodiment of this invention including airflow passages defined on one side of the sorbent sheet;

FIG. 4 is a perspective view of an embodiment of this invention including airflow passages;

FIG. 5 is an enlarged view showing a cut away portion of a sorbent sheet;

FIG. 6, is another embodiment of this invention including an alternate structural support configuration;

DETAILED DESCRIPTION OF THE PREFERRED EMBODIMENT

Figure 1:
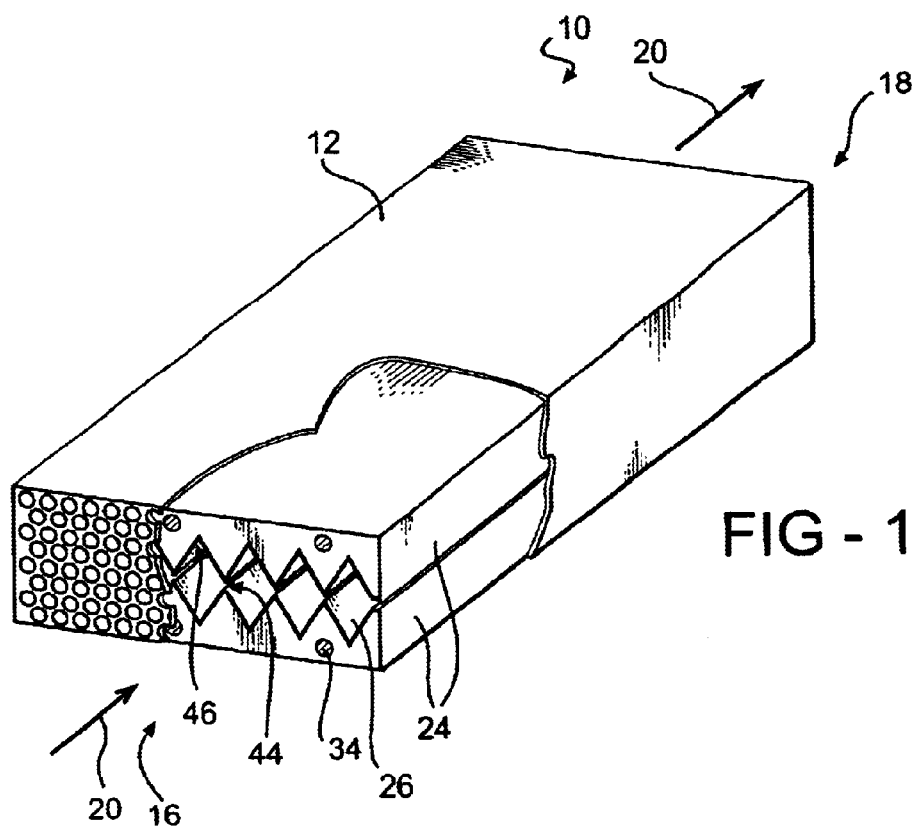
FIG. 1 is an embodiment of this invention enclosed within a rectangular housing.

Referring to, FIG. 1, the system 10 of this invention includes a carbon dioxide sorbent sheet disposed within a housing 12. The housing 12 is rectangular. The sorbent sheet 24 includes a support rod 34 to increase stiffness and durability of the sorbent sheet 24. A steam of air indicated at 20 flows through inlet 16 into the system 12, through air flow passages 26 and outlet 18. The airflow passages 26 are formed by a series of alternating peaks 44 and valleys 46. Carbon dioxide ($CO_2$) is absorbed from the air stream 20 by the sorbent material disposed within each of the sorbent sheets 24.

Figure 2:
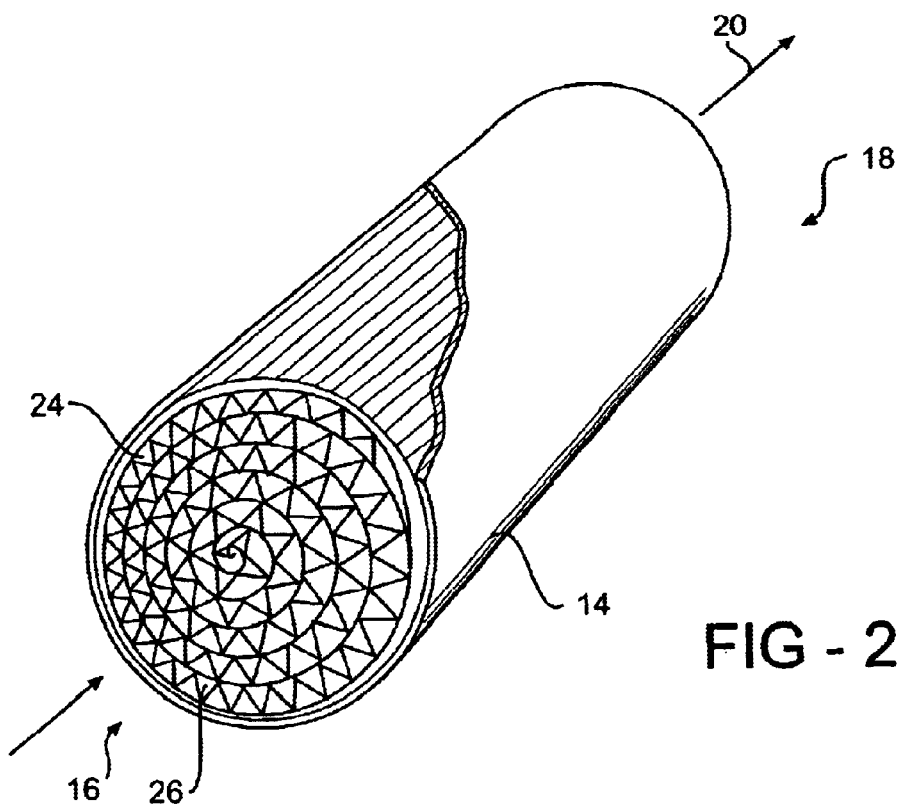
FIG. 2 is an embodiment of this invention enclosed within a cylindrical housing.

FIG. 2 illustrates another embodiment of the system including a cylindrical housing 14. The sorbent sheet 24 is spirally wound within the housing 14 to form plurality of airflow passages 26. Although rectangular and cylindrical housings 12,14 are shown, it is within the contemplation of this invention to use any configuration of housing as is known to a worker skilled in the art.

Referring to FIG. 3, two sorbent sheets 24 include support rods 34. The support rods 34 extends through and within the encapsulated sorbent sheets 24 to provide a specific required rigidity that increases the durability and handling characteristics of the sorbent sheets 24 which also aids in the assembly process. Each of the sorbent sheets 24 includes first and second sides 28, 30. The air passages 26 are formed by a series of alternating peaks 44 and valleys 46. As appreciated, although a peak and valley configuration of the sorbent sheet 24 is shown in this embodiment, it is within the contemplation of this invention that other shapes of the airflow paths that would define an airflow passage 26 would be within the contemplation of this invention as would be known to a worker skilled in the art.

The sorbent sheet includes a first thickness 45 and a second thickness 47. The second thickness 47 is different than the first thickness 45 and provides for the formation of the airflow passage 26 between stacked sorbent sheets 24. The thickness varies between the first and second thickness 45 and 47 such that the sorbent sheet 24 presents a non-uniform cross section.

Referring to FIG. 4, the first side 28 of the sorbent sheet 24 is planar and defines a first plane 27. The second side 30 is non-planar and includes the series of peeks 44 and valleys 46. A second plane 29 is defined across the peeks 44 of the second non-planer side 30. Between the first and second planes are a flow surfaces 25. The flow surfaces 25 define a portion of the flow passage 26.

Referring to FIGS. 4 and 5, the sorbent material 40 is encapsulated within the sorbent sheet 24 by a porous metal indicated at 22. The porous metal 22 includes a specific thickness indicated at 38 that completely encapsulates the sorbent material 40. The sorbent material 40 disposed within the porous metal 22 may be of any type known to a worker skilled in the art. The sorbent material 40 may be regenerable or non-regenerable as is required by the specific applications and configuration of the system 10. Many types of sorbents are known to workers skilled in the art and such sorbents are all within the contemplation of this invention and the specific type of sorbent used is application specific.

The porous metal 22 is of such a porosity as to allow for a diffusion of gases from flow stream 20 into the sorbent material 40. The porous metal 22 may be of any type or porosity known to a worker skilled in the art. Further, it is known, by workers skilled in the art, that the specific porosity of the porous metal 22 will be governed by application specific requirements. Higher porosities will allow for higher gas diffusion rates from the sorbent material 40 encapsulated within the porous metal.

Powdered metal is one type of material used to encapsulate the sorbent material 40. Further, the specific type of material comprising the porous metal is dependent on elements within the flow stream 20 and the chemical compatibility of the solvent. As is known, a worker skilled in the art would understand how the compatibility of certain materials within the sorbent assembly flow stream would govern the selection of materials of the porous metal structure encapsulating the sorbent material 40.

In an embodiment of this invention, a coating 42 is disposed between the porous metal 22 and the sorbent material 40. A porous hydrophobic coating will allow for gas diffusion while preventing water from potentially contacting the sorbent material 40 which may result in leaching of the sorbent.

Referring to FIG. 1, in another embodiment of this invention the outer layer 22 is formed from a metal material including a plurality of openings 45 forming a fine mesh 47. The fine mesh 47 allows the required diffusion of gases from the adjacent flow stream 20 into the sorbent material 40.

Referring to FIG. 6, another embodiment of the sorbent sheet 24 is shown including a plurality of ribs 36 instead of the rods 34. The ribs 36 comprise the support structure and illustrate additional structures integrally formed within the sorbent sheet 24 providing structural rigidity. The ribs 36 provide the additional rigidity required to improve assembly characteristics for the sorbent sheet 24. Note that other configurations and support structures would be within the contemplation of this invention as is known by a worker skilled in the art.

Figure 7:
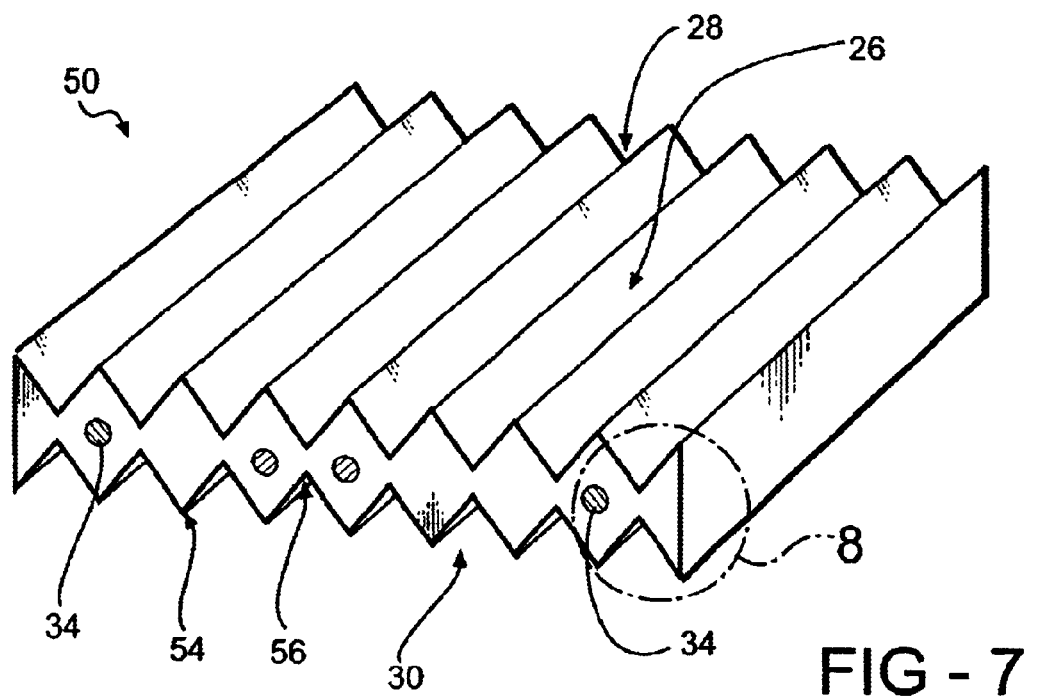
FIG. 7 is another embodiment of this invention including airflow passages disposed on either side of the sorbent sheet.

Referring to FIG. 7, another embodiment of the sorbent sheet 24 is generally indicated at 50. The sorbent sheet 50 of this embodiment includes a first side 28 and second side 30. Both of the sides 28, 30 include peaks and valleys 54, 56 forming airflow passages 26. Further, in many applications it may be desirable to specifically stack and combine the embodiments shown indicated at 50 with sorbent sheet 24 having airflow passages formed on only one side. The specific configuration of the airflow passages is application specific and designed to provide a desired pressure drop through the system 10.

Figure 8:
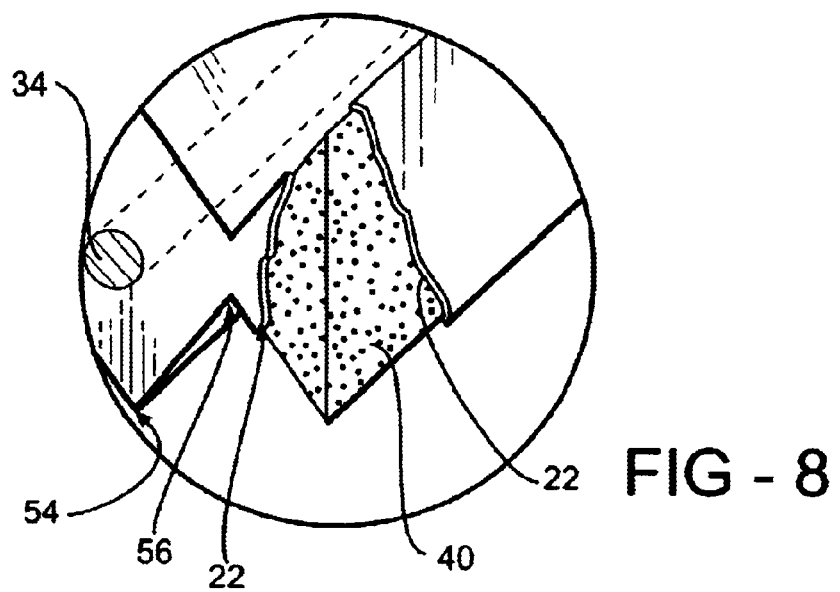
FIG. 8 is an enlarged view showing a cut away portion of the sorbent sheet.

Referring to FIG. 8, the encapsulating material 22 is cut away to reveal the sorbent material 40. In this embodiment, only the encapsulating material 22 is used without the additional layer 42 shown in FIG. 5. It is within the contemplation of this invention that the layer 42 can be used or not used dependent on the application specific requirements.

The sorbent sheets of this invention comprise a porous metal or fine mesh encapsulated sorbent that defines airflow passages without the use of additional members or structures and that includes integrally formed structural members. The structure of the sorbent sheets of this invention prevent undesirable expansion during use that can vary the airflow channel or airflow passage dimensions which in turn results in an increase of pressure drop during use.

The foregoing description is exemplary and not just a material specification. The invention has been described in an illustrative manner, and should be understood that the terminology used is intended to be in the nature of words of description rather than limitation. Many modifications and variations of the present invention are possible in light of the above teachings. The preferred embodiments of this invention have been disclosed, however, one of ordinary skill in the art would recognize that certain modifications are within the scope of this invention. It is understood that within the scope of the appended claims, the invention may be practiced otherwise than as specifically described. For that reason the following claims should be studied to determine the true scope and content of this invention.

What is claimed is:

1. An assembly for removing carbon dioxide ($CO_2$) comprising;
   a $CO_2$ sorbent sheet that has a variable thickness defining a portion of a flow passage; and
   a metal material encapsulating said sorbent sheet providing diffusion of gases from a flow stream, wherein said $CO_2$ sorbent sheet completely fills an encapsulated space defined by said metal material.

2. The assembly of claim 1, wherein said metal material is porous for allowing diffusion of gases from an adjacent flow stream.

3. The assembly of claim 2, wherein said porous metal is formed from powdered metal.

4. The assembly of claim 1, wherein said metal material comprises a fine mesh with a plurality of openings for allowing diffusion of gases from an adjacent flow stream.

5. The assembly of claim 1, wherein said variable thickness sorbent sheet comprises a series of alternating peaks and valleys.

6. The assembly of claim 1, wherein said sorbent sheet includes first and second sides, and said flow passage is formed on one of said first and second sides.

7. The assembly of claim 1, wherein said sorbent sheet includes first and second sides, and said flow passage is formed on both of said first and second sides.

8. The assembly of claim 1, including a support structure disposed within said sorbent sheet.

9. The assembly of claim 8, wherein said support structure is a rod extending laterally within said sorbent sheet.

10. The assembly of claim 8, wherein said support structure is a rib formed within said sorbent sheet.

11. The assembly of claim 1, wherein said sorbent sheet is regenerable.

12. The assembly of claim 1, wherein said sorbent sheet is non-regenerable.

13. The assembly of claim 1, including a layer disposed between said sorbent sheet and said porous metal.

14. The assembly of claim 13, wherein said layer comprises a porous hydrophobic material.

15. A sorbent sheet assembly comprising:

a $CO_2$ sorbent that has a variable thickness for defining a portion of a flow passage;

a porous metal encapsulating said $CO_2$ sorbent sheet and providing for diffusion of gases from an air stream, wherein said $CO_2$ sorbent sheet completely fills an encapsulated space defined by said porous metal; and a support structure disposed within said $CO_2$ sorbent.

16. The assembly of claim 15, wherein said flow passage is defined within said $CO_2$ sorbent.

17. The assembly of claim 15, wherein said $CO_2$ sorbent has first and second sides and a plurality of said flow passages disposed on one of said first and second sides.

18. The assembly of claim 15, including a lining disposed between said sorbent material and said porous metal.

19. The assembly of claim 15, wherein said support structure is a rod extending along a length of said sorbent sheet.

20. The assembly of claim 1, wherein said $CO_2$ sorbent includes a first nominal thickness and a second thickness greater than said first thickness.

21. The assembly of claim 20, wherein said first thickness and said second thickness alternate to provide said flow passage.

22. An assembly for removing Carbon dioxide ($CO_2$) comprising:

a $CO_2$ sorbent sheet that has a planer side and a non-planar side; and a porous metal material encapsulating said $CO_2$ sorbent sheet such that said $CO_2$ sorbent sheet completely fills an encapsulated space defined by said porons metal.

23. The assembly as recited in claim 22, wherein said planar and non-planar sides are substantially parallel to each other.

24. The assembly as recited in claim 22, wherein said non-planar side includes a flow passage.

25. The assembly as recited in claim 24, wherein said flow passage comprises a groove.

26. The assembly as recited in claim 25, wherein said groove comprises a V-shaped cross-section.

27. The assembly as recited in claim 22, comprising at least two sorbent sheets stacked such that a planar side of one sorbent sheet is adjacent a non-planar side of a second sorbent sheet.

28. The assembly as recited in claim 27, wherein said at least two sorbent sheets are encapsulated together.

* * * * *